United States Patent [19]

Otsu et al.

[11] 4,288,779

[45] Sep. 8, 1981

[54] METHOD AND APPARATUS FOR CHARACTER READING

[75] Inventors: Nobuyuki Otsu, Tokyo; Shunji Mori, Kashiwa; Taiichi Saito, Tokyo, all of Japan

[73] Assignees: Agency of Industrial Science & Technology; Ministry of International Trade & Industry, both of Tokyo, Japan

[21] Appl. No.: 54,704

[22] Filed: Jul. 5, 1979

[30] Foreign Application Priority Data

Jul. 8, 1978 [JP] Japan ............................... 53/82512

[51] Int. Cl.³ ............................................... G06K 9/68
[52] U.S. Cl. ................... 340/146.3 Y; 340/146.3 MA
[58] Field of Search ........... 340/146.3 AC, 146.3 AE, 340/146.3 AG, 146.3 MA, 146.3 Y, 146.3 R

[56] References Cited

U.S. PATENT DOCUMENTS

| | | | |
|---|---|---|---|
| 3,165,718 | 1/1965 | Fleisher | 340/146.3 Y |
| 3,297,993 | 1/1967 | Clapper | 340/146.3 AE |
| 3,346,845 | 10/1967 | Fomenko | 340/146.3 Y |
| 3,347,981 | 10/1967 | Kagan et al. | 340/146.3 Y |
| 3,522,586 | 8/1970 | Kiji et al. | 340/146.3 MA |
| 3,634,823 | 1/1972 | Dietrich et al. | 340/146.3 Y |
| 3,723,970 | 3/1973 | Stoller | 340/146.3 MA |
| 3,845,466 | 10/1974 | Hong | 340/146.3 Y |
| 3,873,972 | 3/1975 | Levine | 340/146.3 AC |
| 4,075,604 | 2/1978 | Degasperi | 340/146.3 AG |
| 4,104,616 | 8/1978 | Isshiki et al. | 340/146.3 Y |

*Primary Examiner*—Leo H. Boudreau
*Attorney, Agent, or Firm*—Kurt Kelman

[57] ABSTRACT

A method for character reading requiring no character segmentation, which method effects required character recognition by the steps of subjecting a given string of character patterns to continuous scanning to produce either a local feature vector at each of the intersections of rows and columns of character patterns or a global feature vector for each of the columns formed in consequence of the scanning, linearly consolidating either or both of the feature vectors to obtain a lower dimensional vector in new feature axes and continuously matching the vectors with the standard ones set in advance.

5 Claims, 6 Drawing Figures

Fig_2

Answer → ? ? ? ? ? ? ? ? ? ? ? ? ? AAAAAAA ? ? ? ? ? ? ? ? ? ? ? ? ? BBBB BBB

METHOD AND APPARATUS FOR CHARACTER READING

BACKGROUND OF THE INVENTION

This invention relates to a method for character reading which permits character recognition to be carried out continuously without necessitating any segmentation of characters being read and to an apparatus used for practicing this method.

In the art of character recognition, a good many methods have been proposed. They require a common processing operation. This processing operation consists in segmenting a multiplicity of characters manually written or mechanically printed in a string into individual characters. Generally for the reading of characters, one prerequisite is a preprocessing which comprises positioning characters to be read and segmenting the string of characters into the individual characters in preparation for character recognition.

In the established art of optical character recognition (hereinafter abbreviated as OCR), the operation of character segmentation is accepted as an indispensable step of processing. By this reason, typical OCR forms used for recognition of manually written characters invariably have frames printed in fixed positions, expecting their users to heed the rule that the characters written on the forms should be perfectly contained within the respective frames. Even for the printed characters, conventional OCR specifies the shapes, the sizes of the characters and symbols used in printing and also a printing pitch such as 10 characters per inch.

The only method so far developed to provide the operation of character recognition without necessitating the aforementioned preprocessing of character segmentation is that which makes use of standard masks prepared for all the character categories and effects desired character recognition by continuously correlating matching the input character being successively brought into a fixed character frame with the standard masks. This method necessitates the calculation of two dimensional correlation each time one input character is brought into the character frame and requires the two dimensional correlation to be carried out with respect to all the character categories on each character being correlated. In view of the volume of calculation involved in the correlation and the speed of calculation required, the actual practice of this method would entail a huge operation. Even when input characters are printed ones, characters of one same size and category are not totally free of pattern variation due to difference in the font used. To absorb this particular pattern variation, the number of standard masks prepared for each character category must be amply increased, requiring a proportional increase in the work of mask matching. Thus, many difficult problems stand in the way of practical use of this method.

Even if there exists a method which obviates the aforementioned simple principle of correlation and permits exact extraction of important geometrical features indicative of character shapes, the common underlying problems of OCR remain yet to be solved because characters given in a string are not always segmented with required accuracy.

In any event, the extraction of features of characters is desired to be effected by a simple method which enjoys as much freedom from the segmentation problem as possible. This leads to the conclusion that additive feature extraction is ideal for the purpose. Unlike the method which effects the character recognition by the steps of segmenting a given character pattern, extracting the entire real image of that character in the form of geometrical features and matching the features with standard masks throughout the entire area involved, the additive feature extraction represents a method which, by means of one scanning column for example, analyzes character patterns being continuously passed through that scanning column and accumulating and updating the resultant character information for each of the columns. The two methods are now compared briefly from the standpoint of processing devices. The former method which resorts to extraction of features in the entire area necessitates service of a memory capable of storing the character information from all the scanning columns involved, whereas the latter method functions effectively with an accumulating counter capable of storing the character information from only one scanning column. Thus, the latter method entails decisively less redundancy than the former method. In addition, since the former method relies for its operation upon entire matching of characters at one time, the probability of recognition being obstructed as by a slight deformation, defect, noise, etc. in a given character is greater for this method than for the other method.

An object of this invention is to provide a method for character reading capable of effecting extraction of character features continuously at a high speed with high reliability without necessitating any processing for character segmentation, and to an apparatus for practicing the method described above.

SUMMARY OF THE INVENTION

To accomplish the object described above according to the present invention, there is provided a method for character reading, which effects recognition of characters by the steps of subjecting to continuous discrimination scanning a string of character patterns with a photoelectric scanner; matching the adjoining points in the individual rows and columns with fixed mask patterns; producing histograms (emersion frequencies) for the respective sub-scanning; accumulating these histograms in the main scanning and consequently obtaining vectors of local features or performing a run-length processing on each of the columns of characters which have undergone the aforementioned discrimination scanning to obtain vectors of global features, subjecting the vectors of local features and/or the vectors of global features to linear consolidation to obtain new vectors by adaptively converting the feature axes efficient for recognition purposes; and continuously matching the new feature vectors with the standard ones prepared in advance for all the character categories.

The patterns of the masks used for producing the local feature vectors are designed so that they form independent bases efficiently representing a multiplicity of local sub-patterns contained in character patterns. The vectors used for representing the global features enjoys the limitedness of redundancy because of the fact that they have undergone the run-length processing. The linear consolidation of the vectors of local features and/or global features extracted additively and continuously obviates otherwise required segmentation of a string of characters into the individual characters, permits processing to be effectively performed on characters of any kind, and minimizes the possible effects of defects in characters.

The other objects and characters of the present invention will become apparent from the further disclosure of the invention to be given hereinafter with reference to the accompanying drawing.

DETAILED DESCRIPTION OF THE INVENTION

The method for character reading according to this invention is described with reference to the typical processing system illustrated in FIG. 1. The characters ABC to be read out are indicated in the uppermost portion of the diagram. A line sensor 1 having a multiplicity of character-reading elements $1_1$-$1_n$ (n=30 in this invention, for example) arranged serially in the column direction, namely the vertical direction in the drawing (sub-scanning direction), is moved in the row direction, namely the horizontal direction (main-scanning direction), to sweep over and read out the characters in one character string. The reading elements which are photoelectric elements, for example, detect the states of all the intersecting portions formed of the rows and columns mentioned above in terms of binary bits and obtain a set of binary coded signals. Generally, the signal "1" is obtained for an intersecting portion which is black and the signal "0" for an intersecting portion which is white. This processing by use of binary bits is accomplished by converting the analog information acquired through the line sensor 1 into corresponding digital information by the medium of a binary conversion circuit 2 having a fixed threshold value set in advance. The output from the binary conversion circuit 2 is sequentially stored in a buffer shift register (hereinafter abbreviated as BSR) 3 having a capacity for a total of n bits.

When the line sensor 1 completes the sampling of one column, the BSR 3 is filled to its capacity. At this stage, the information for one column is simultaneously transferred to a feature-extraction buffer shift register (hereinafter abbreviated as FBSR) which consists of three BSR's 4a, 4b and 4c and a total of 3n bits. In this case, the information which is already contained in the uppermost BSR 4a of the FBSR 4 is cancelled by the newly incoming information and, therefore, must be shifted in advance to the immediately following BSR 4b. This rule similarly applies to the intermediate BSR 4b of the FBSR 4. The information already contained in this BSR 4b must be transferred to the immediately following BSR 4c before the information is newly received from the immediately preceding BSR 4a. As described above, the FBSR 4 is required to be a group of registers capable of shifting the column information. Because of the function described above, the FBSR 4 always contains therein the character pattern information in the last three columns, except in the initial state.

Now a description will be given of the extraction of (local and global) character features.

Where information has been received as illustrated in the drawing, the FBSR 4 enters the next step for the extraction of character features. Broadly the extraction of character features is divided into two types: They are the extraction of local features and that of global features in the direction of column.

Various local features are conceivable. Of the autocorrelation series of the n'th order, the portion materialized by use of $3\times3$ masks series up to the third order will be assumed to be used for the immediate purpose of description. A typical collection of mask series usable for this purpose are illustrated in FIG. 2.

Figure 2:
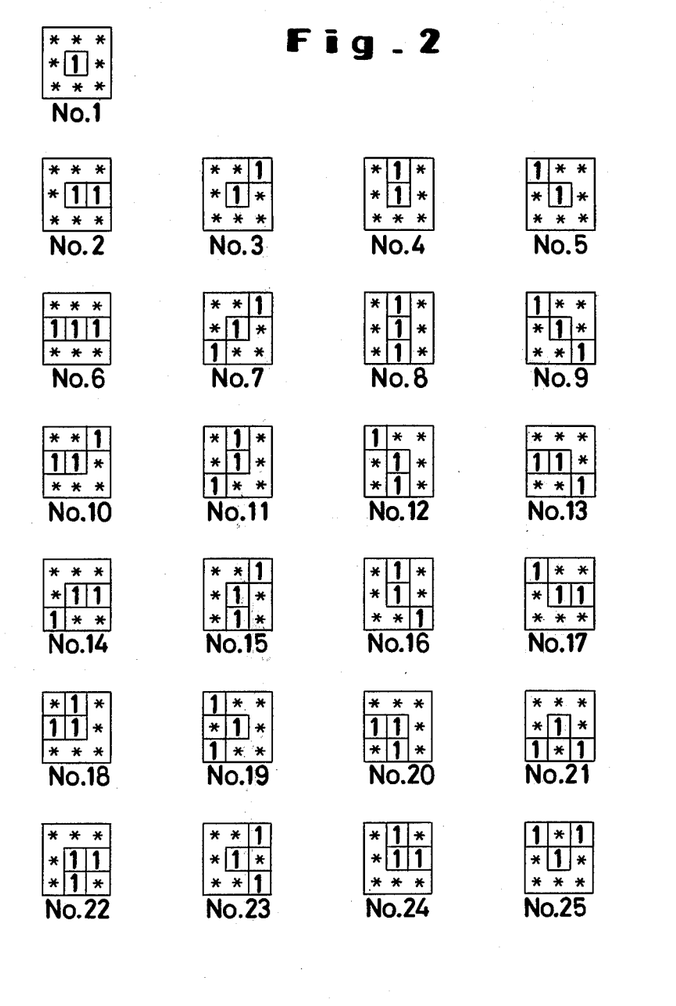
FIG. 2 represents typical patterns of the masks used for the extraction of local features of characters in the method of the present invention.

In FIG. 2, there are shown a total of 25 masks No. 1 through No. 25. Each mask is identified by the location of the digit "1" in the specific square(s) among a total of nine squares. The squares indicated by the star (*) may contain either "1" or "0." In the case of the mask No. 1, whenever "1" occurs in the middle square, the output of this mask is "1." The mask No. 1 represents a mask of the first order, the masks No. 2 through No. 5 represent masks of the second order and the masks No. 6 through No. 25 represent masks of the third order.

Now, the patterns of three columns by n-rows stored in the FBSR 4 are matched with the aforementioned masks to obtain histograms of the respective masks. A collation circuit 6 used for this purpose is shown in FIG. 3.

Figure 1:
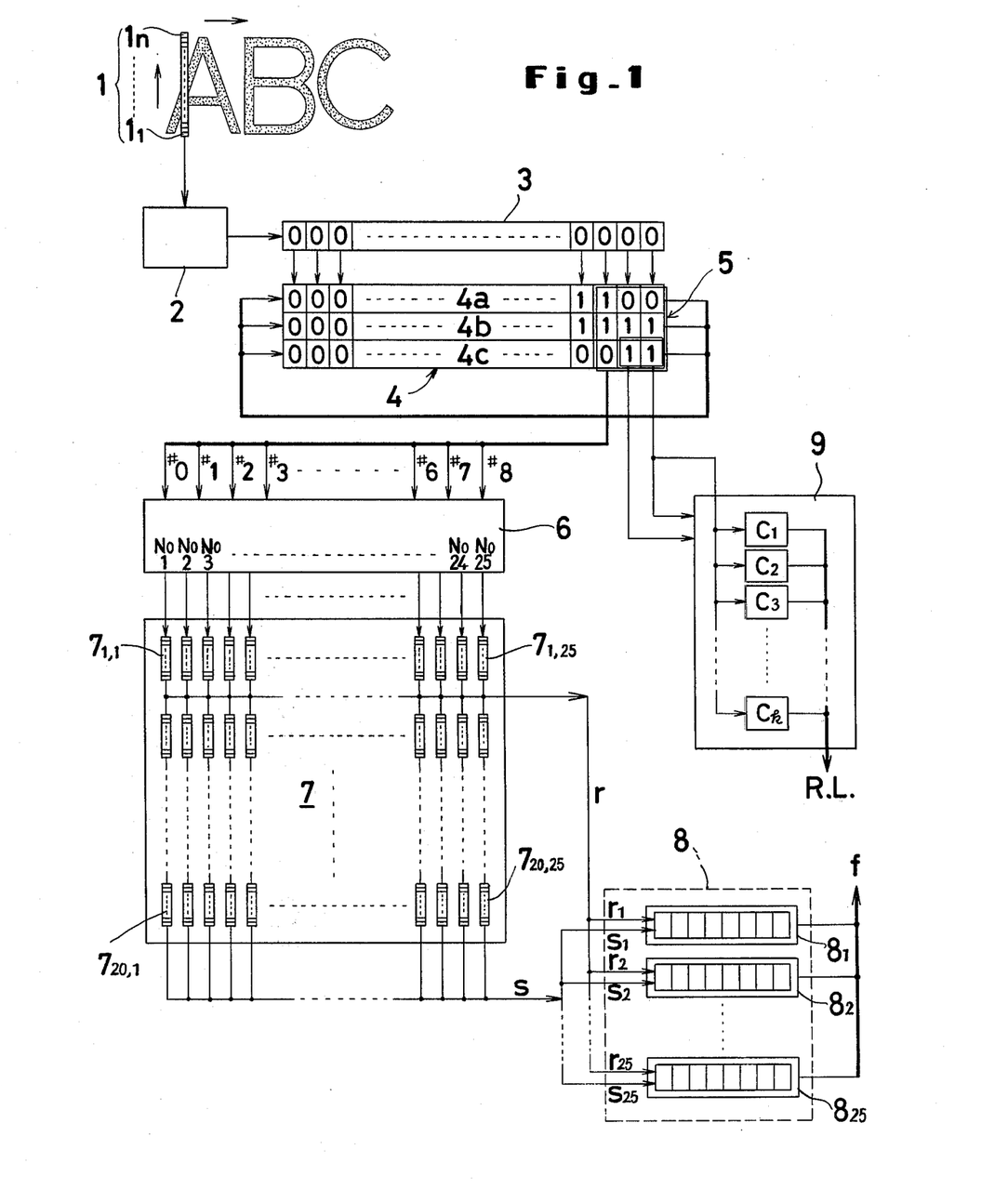
FIG. 1 is a block circuit diagram illustrating the principle of the formation of feature vectors in the method of this invention for character reading.
Figure 3:
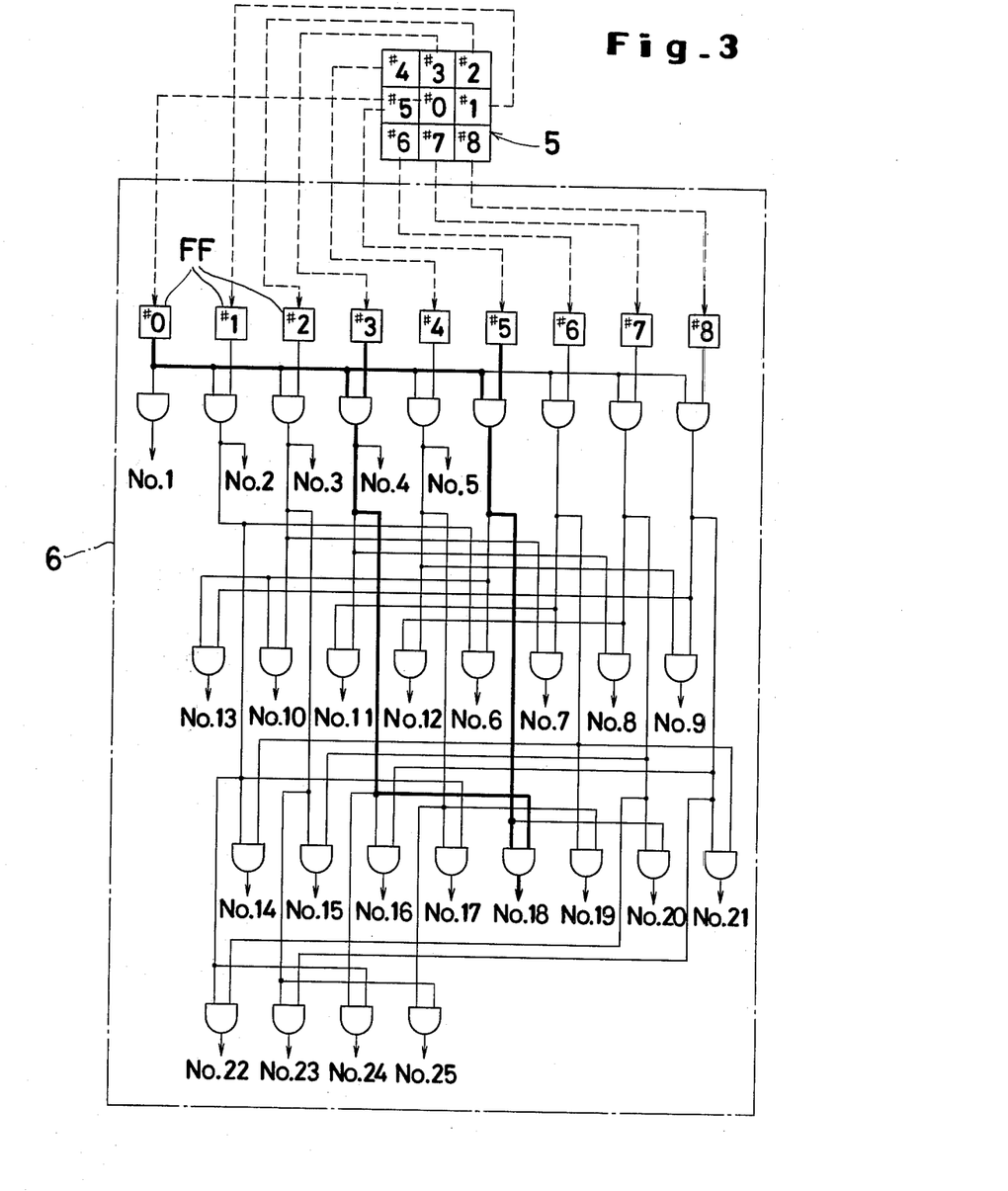
FIG. 3 is a typical circuit used for matching character features and the mask patterns.

The $3\times3$ mask 5 illustrated in the uppermost portion of the diagram of FIG. 3 corresponds to the rightmost $3\times3$ portion of the FBSR 4 of FIG. 1. Inside this mask, the addresses #0 through #8 are used to label the squares. The binary values "1" or "0" contained in the addresses #0 to #8 are delivered as input to the corresponding flip-flops FF in the circuit which is composed of the flip-flops FF and as many AND gates. As may readily be comprehended by comparison with the patterns of the masks of FIG. 2, the resultant combination of outputs is correctly identified by the particular mask with which the combination conforms. Take the mask No. 18 of FIG. 2, for example. In this case, since the addresses #0, #3 and #5 each contains the binary code "1," the output of this mask No. 18 is the output of the gate which receives, as its input, the output of the AND gate taking its input from #0 and #3 and the output of the AND gate taking its input from #0 and #5. Consequently, there is derived a local-feature vector having the "1" and "0" informations of the 25 dimension, for example.

For the information of the FBSR 4 of FIG. 1 to be taken out through its rightmost end, it must be shifted in the direction of row of the FBSR 4. To prevent loss of the information, the information must be returned to its original (leftmost) position. To permit this return of the information, the FBSR 4 is a second order, serial shift register.

It is now necessary to draw feature frequency (histogram) from the results of the local matching with the mark patterns and consequently determine a feature vector. The additive extraction method which is designed to effect the extraction of character features by as simple a processing operation as possible effects the extraction in the form of histograms which represent character information in terms of emersion frequency of local primitive patterns.

The means for obtaining feature vectors by the additive extraction method comprises a histogram register 7 and a histogram accumulator 8. The histogram register 7 in the present embodiment has a total of 500 30-bit memories, $7_{1,1}$–$7_{1,25}$, $7_{2,1}$–$7_{2,25}$, ... $7_{20,1}$–$7_{20,25}$ arranged as illustrated, forming shift registers in the direction of column to handle the volume of information in 25 columns by 20 rows covered by the scanning with the line sensor and the 25 outputs produced in the matching circuit 6.

The memories $7_{1,1}$–$7_{1,25}$ in the first row receive, as their input, the outputs of the gates No. 1–No. 25 in the matching circuit 6 of FIG. 3. Each time the line sensor 1 is shifted by one column in the main-scanning direction, the line sensor issues an output which is stored in the memories $7_{1,1}$–$7_{1,25}$. The information so far stored in these memories is transferred to the memories $7_{2,1}$–$7_{2,25}$ of the following row. In consequence of the progress of the main-scanning by the line sensor 1, the information for the last 20 columns so far stored is sequentially stored in the histogram register 7. Correspondence of the contents of the histogram register 7 to the characters of FIG. 1 is such that at one time, the contents correspond exactly to the character "A" and, at another time, they correspond to a combination of one latter half of the character "A" and one former half of the character "B." Thus, the contents vary with the movement of the line sensor 1.

The output of the histogram register 7 is forwarded to the histogram accumulator 8, wherein the character features are additively processed. The histogram accumulator 8 of FIG. 1 is a typical example, wherein $8_1$–$8_{25}$ represent up-down counters (e.g. 8 bits), to the addition terminals $r_1$–$r_{25}$ of which are added the respective outputs of the memories $7_{1,1}$–$7_{1,25}$ in the first row of the histogram register 7. To the subtraction terminals $s_1$–$s_{25}$ of the up-down counters are added the respective outputs of the memories $7_{20,1}$–$7_{20,25}$ of the 20th row of the histogram register 7. As a result, the contents of the histogram accumulator 8 are added by the outputs of each new column and are deducted by the information of the oldest column each time the line sensor 1 is shifted by one column in the main scanning. At all times, therefore, the number of "1"s (or that of "0"s) in each column of the histogram register 7 are counted. In this manner, the local features are obtained in the histogram accumulator 8.

The formation of local feature vectors of p-dimensions (p=25 in the preceding case) has been described. Use of the p-dimensional feature vectors in the present invention will be described afterward. Now, a description is given of the extraction of global features.

Several methods are conceivable for the extraction of global features in the column direction. Two typical ones are the run-length processing method and the moment processing method. The present invention makes use of the run-length processing which is frequently adopted for coding binary images and represents the lengths of continued rows of black or white squares in terms of binary codes.

Figure 4:
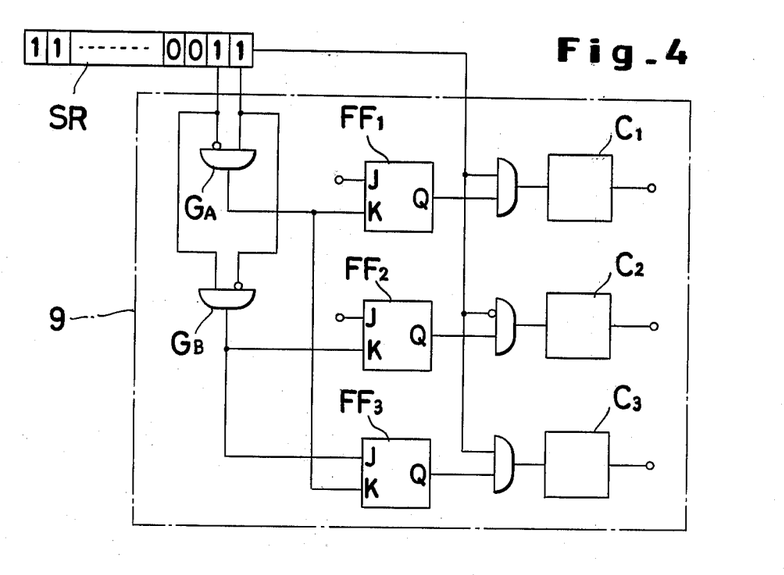
FIG. 4 is a typical circuit used for measuring the run-length.

The function of the circuit 9 for measuring run-lengths (RL) will be described briefly with reference to FIG. 4. As the line sensor 1 sweeps over a column while the flip-flop $FF_1$ is in its set state, it continues to forward the binary code "1" via the shift register SR. Consequently, the signals are counted in the counter $C_1$. This counting is effected by the fact that the output of the final stage of the shift register SR is multiplied by the output Q of the $FF_1$ and the resultant AND gate is received as an input in the counter $C_1$. At this time, the flip-flop $FF_2$ is in its set state, whereas the counter $C_2$ in the subsequent stage is empty of input signal and is at rest and the flip-flop $FF_3$ is retained in its OFF state. Then, as the signal changes from black to white (1→0), the gate GA is turned on and the flip-flop $FF_1$ is reset. At the same time, the $FF_2$ which has been set previously causes the subsequent signal of "0" series representing a row of white squares to be counted in the counter $C_2$. As the subsequent signal changes from white to black (0→1), the $FF_2$ is reset and the counter $C_2$ ceases to take count and the flip-flop $FF_3$ is set. The output Q of the flip-flop $FF_3$ turns on the counter $C_3$, which starts taking count of the inputs "1" representing black squares. Although FIG. 4 depicts an arrangement of only three counters for the simplicity of description, a plurality of counters $C_1, C_2, \ldots C_k$ appropriate for the volume of information actually involved are combined to form a counter series which is operated for the determination of run-length RL. This means that the run-length is expressed by a vector of k-dimensions.

There are obtained two feature vectors: They are the local feature vector of n-dimensions and the global feature vector of k-dimensions (actually 8-dimensions at the most) obtained by the run-length processing. What should be particularly noted at this point is the fact that these two feature vectors are determined on the limited information from the zone of 3×n as shown in the FBSR 4 of FIG. 1. Also in the case of the run-length vector, there can be obtained a histogram in much the same way as in the case of the local feature vector. A description of the formation of this histogram is omitted to avoid repetition.

The local feature vector and/or the global feature vector obtained as described above are linearly consolidated into a vector of m-dimensions so as to befit discriminant analysis. The means adopted for this consolidation will be described.

First, conversion of the local feature vector or the histogram f of p-dimensions into a new feature vector will be explained. This conversion consists in multiplying the following vector:

$$f = (f_1, \ldots, f_p)$$

by a matrix A to produce a vector g of m-dimensions. This corresponds to the operation of the following calculation:

$$g = A \cdot f = \begin{pmatrix} a_{1,1} & \cdots & a_{1,p} \\ \vdots & & \vdots \\ a_{m,1} & \cdots & a_{m,p} \end{pmatrix} \begin{pmatrix} f_1 \\ \vdots \\ f_p \end{pmatrix}$$

Figure 5:
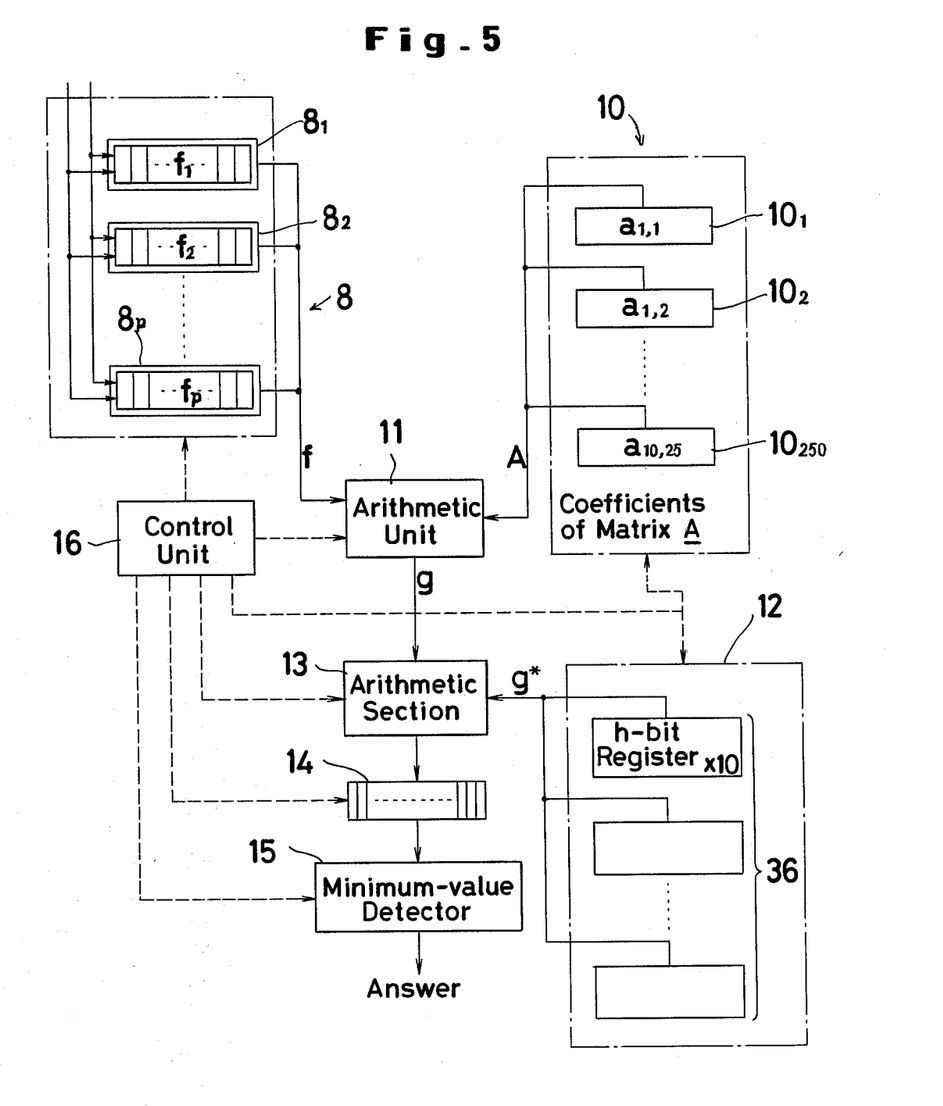
FIG. 5 is a typical configuration of circuits to be used for conversion of feature axes and subsequent consolidation.

This operation necessitates performance of multiplications and additions. Assume p=25 and m=10 to facilitate understanding, and the coefficients (the elements $a_{1,1}, a_{1,2}, \ldots a_{10,25}$) of the matrix A will be each composed of 8 bits. This matrix A is assumed to contract the 25-dimensions to the 10-dimensions. The block diagram of a typical circuit which serves to effect the feature axis conversion and the subsequent matching is shown in FIG. 5. This circuit consists of a histogram accumulator 8, a coefficient setter 10 for the matrix A and e-bit registers $10_1$–$10_{250}$ (e.g., e=8). They may be fixed memories. The outputs of the histogram accumulator 8 and the coefficient setter 10 are both received as input by the arithmetic unit 11, wherein multiplications and additions are performed. The arithmetic unit 11 issues g (such as of 10-dimensions) in the new feature axes.

Subsequently, the vector g of 10-dimensions (generally of the m-dimensions lower than p-dimensions) is subjected to matching with the standard ones $g^*_i$. This matching consists in measuring the distance from the vector g to the mask $g^*_i$. Here, a simple form of information which is the absolute value (norm) of the difference is utilized. This is expressed as follows:

$$|g - g^*_i|$$

In this expression, index i denotes the total number of characters to be read and might, for example be 36 (26 letters of the alphabet plus 10 numerical characters), namely, i=1–36 in that case.

FIG. 5 illustrates a configuration in which there are arranged a total of 360 h-bit registers 12 (e.g., h=8), namely 36 categories each consisting of ten registers on the assumption of 10-dimensions per category. Denoted by 13 is the arithmetic section, in which the aforementioned operation of distance measurement is performed. The results of the operation are stored in a memory 14 which is formed of 36 j-bit registers (e.g., j=4). They are parallelly compared by the minimum-value detector 15, which issues the category of the character giving the minimum value as the answer to the input character. By 16 is denoted a control unit.

What matters at this point is the efficiency with which the matrix A is determined. This matrix A can automatically be formed from the training data of characters by the application of the technique of multivariate analysis (especially, discriminant analysis). Multivariate analysis itself is well known to the art and an explanation is omitted here to avoid repetition.

The aforementioned matching is carried out each time the line sensor 1 (of FIG. 1) is shifted by one column. In this sense, therefore, the results of matching are obtained substantially continuously. In the case described above, scanning of each character is completed after the line sensor 1 has been shifted a total of 20 times each by the width of the line sensor 1 in the direction of sub-scanning. As a result, the minimum value detector 15 of FIG. 5 issues 20 answers during the scanning of each character. This situation is depicted in terms of the relation among the character, the line sensor 1 and the answer in FIG. 6.

Figure 6:
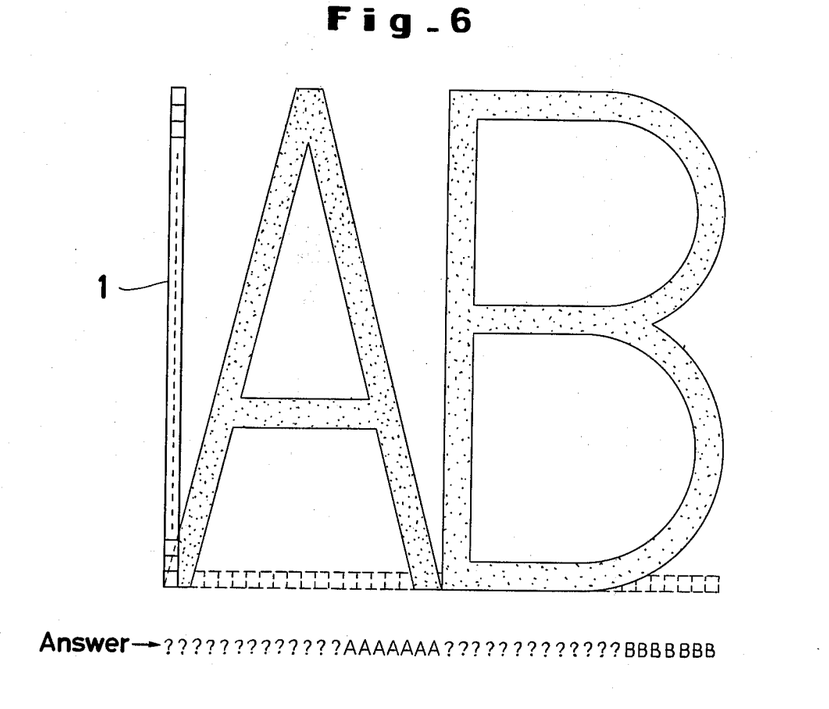
FIG. 6 is an explanatory diagram illustrating the relation between characters, a line sensor and responses.

In FIG. 6, the characters A and B are divided by the width of the line sensor 1 as shown by dotted lines. In the first part of the scanning of each character, the identity of that character is hardly discernible and the answers issued are all ?'s. As the scanning proceeds, the answers become increasingly clear to give the identity of A or B. The answers are continuous and are produced in consequence of the movement of the line sensor 1. Unlike the conventional method which involves segmentation of each character and, therefore, produces just one answer for each character, the method of this invention produces as many answers as the widths of the line sensor 1 which go into the width of the character under discussion. These answers are invariably issued continuously.

In the preceding preferred embodiment, the operation of the method of this invention has been described with respect to characters as representing patterns. This invention is not limited to these characters but may be used effectively for the recognition of any patterns such as symbols and figures, as a matter of course.

As described in detail above, this invention effects character reading by the steps of continuously scanning a string of characters given as input by use of a fixed reading frame, consequently deriving local features and/or global features of such characters, producing a feature vector of p-dimensions on the basis of emersion frequency, subjecting the feature vector to linear consolidation to produce a vector of m-dimensions (m<p) and continuously matching the m-dimensional vector with a plurality of the standard vectors formed in advance for variable categories. Thus, the method of this invention totally obviates the character segmentation which has been indispensable to the conventional methods and, what is more, enjoys an advantage that character reading can be performed continuously.

What is claimed is:

1. A character reading method for character recognition, comprising the steps of:
    (a) subjecting a string of character patterns to continuous discrimination scanning carried out by one column in the row direction on the character patterns to produce a digital binary signal derived from the character pattern information of the column being scanned;
    (b) matching sequentially the digital binary signal containing character pattern information with predetermined mask patterns on the basis of histograms of the character patterns, and producing histogram signals of the character feature for each mask pattern;
    (c) accumulating the successively produced histogram signals by additive extraction so as to extract local feature vectors on the basis of the histograms;
    (d) subjecting the local feature vectors to linear consolidation to produce lower dimensional feature axis vectors, and
    (e) matching the feature axis vectors with predetermined standard vectors defined from known character categories.

2. A character reading method for character recognition, comprising the steps of:
    (a) subjecting a string of character patterns to continuous discrimination scanning carried out by one column in the row direction on the character patterns to produce a digital binary signal derived from the character pattern information of the column being scanned;
    (b) subjecting the character pattern information for each column to run-length processing to extract global feature vectors;
    (c) subjecting the global feature vectors to linear consolidation to produce lower dimensional feature axis vectors; and
    (d) matching the feature axis vectors with predetermined standard vectors defined from known character categories.

3. A character reading apparatus for character recognition, comprising:
    (a) a line-sensor having a multiplicity of character-reading elements arranged serially in the column direction of a given string of character patterns to be recognized, said line-sensor being adapted to sweep over the respective character pattern in the row direction and simultaneously convert the information of the character pattern scanned by said line-sensor one column at a time, into a series of signals as detected by each of said character-reading elements;

(b) feature vector extracting means connected to said character-reading elements for extracting feature vectors from the signals received from the line-sensor on the basis of histograms of the character pattern features;

(c) means for linearly consolidating the feature vectors extracted by said feature vector extracting means so as to convert the feature vectors into lower dimensional feature axis vectors; and (d) means for matching the feature axis vector thus converted with predetermined standard vectors defined from known character categories.

4. A character reading apparatus for character recognition, comprising:

(a) a line-sensor having a multiplicity of character-reading elements arranged serially in the column direction of a given string of character patterns to be recognized and adapted to sweep over the respective character pattern in the row direction and simultaneously convert the information of the character pattern scanned by the line-sensor one column at a time into a series of signals as detected by each of said character-reading elements;

(b) a binary conversion circuit coupled to said line-sensor for converting the signals received from said line-sensor into corresponding binary digital signals;

(c) a buffer shift register coupled to said binary conversion circuit for sequentially storing the binary signals from said binary conversion circuit, and for reading out the binary signals of character information one column at a time;

(d) a feature-extraction buffer shift register coupled to said binary conversion circuit and consisting of a group of shift registers each capable of shifting the column information to the following shift register and adapted to store the sequential binary signals for each column of character information fed from said buffer shift register;

(e) a collation circuit coupled to said feature-extraction buffer shift register for matching information patterns represented by a plurality of binary signals stored in said feature-extraction buffer shift register and being adjacent to each other in column and row directions with the mask patterns prepared from histograms of the character feature to derive histogram signals for each mask pattern;

(f) local feature vector extracting means coupled to said collation circuit comprising a histogram register and a accumulator, said histogram register sequentially storing the histogram signals received from said collation circuit and feeding said histogram accumulator, two histogram signals for each mask pattern, one of said two histogram signals being newly stored in the histogram register and other being the oldest signals stored therein, to allow the two histogram signals for each mask pattern to be accumulated by said histogram accumulator thereby to successively extract local feature vectors;

(g) means for subjecting to consolidation the local feature vector thus extracted to convert the local feature vectors into lower dimensional feature axis vectors; and (h) means for matching the feature axis vector thus converted with predetermined standard vectors defined from known character categories.

5. A character reading apparatus for character recognition, comprising:

(a) a line-sensor having a multiplicity of character-reading elements arranged serially in the column direction of a given string of character patterns to be recognized and adapted to sweep over the respective character pattern in the row direction and simultaneously convert the information of the character pattern scanned by said line-sensor one column at a time into a series of signals;

(b) a binary conversion circuit for converting the signals of each column received from said line-sensor into corresponding binary digital signals;

(c) a buffer shift register coupled to said binary conversion circuit and adapted to sequentially store the binary signals from said binary conversion circuit and read out the binary signals, one column at a time;

(d) a feature-extraction buffer shift register coupled to said buffer shift register for receiving and storing the binary signals fed from said buffer shift register;

(e) a run-length measuring circuit coupled to said feature-extraction buffer shift register for subjecting the binary signals fed from said feature-extraction buffer shift register to the run-length processing performed for each of the columns of character pattern to extract global feature vectors;

(f) linear consolidation means coupled to said measuring circuit for subjecting to linear consolidation the global feature vectors thus extracted so as to convert the global feature vectors into lower dimensional feature axis vectors; and (g) matching circuit means coupled to said linear consolidation means for matching the feature axis vectors thus converted with predetermined standard vectors defined from known character categories.

* * * * *